Sept. 11, 1951  T. J. FOX  2,567,879
SPECTACLE FRAME HINGE
Filed Sept. 23, 1949
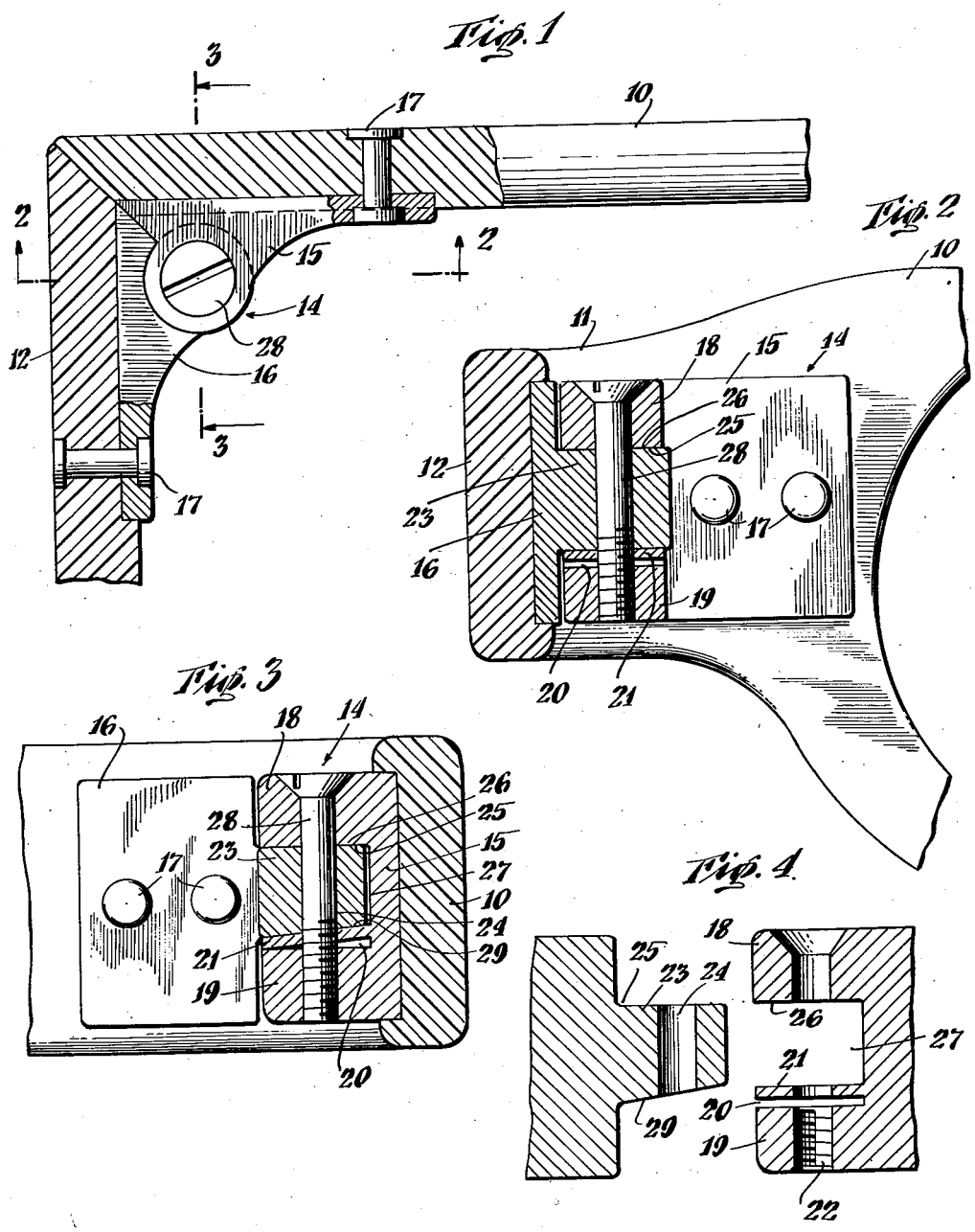
INVENTOR.
Thomas J. Fox
BY
ATTORNEY Patented Sept. 11, 1951

2,567,879

UNITED STATES PATENT OFFICE 2,567,879

SPECTACLE FRAME HINGE

Thomas J. Fox, Brooklyn, N. Y.

Application September 23, 1949, Serial No. 117,339

2 Claims. (Cl. 88—53)

My invention relates to a new type of hinge arrangement for spectacle mountings.

The present method of constructing hinges for spectacle mountings has been found to be highly impractical and to wear very readily and become loose and easily distorted. In the present type of hinge used in spectacle mountings, when the barrels of the hinge wear, the temple of the spectacle has a tendency to fall back and forth against the frame, resulting in a loose fit on the wearer. Furthermore, in the present type of hinge, when said barrels wear, the holding screw tends to loosen and unscrew due to a wrenching action of the mating barrels of the hinge when opening or closing the temple of the frame used in the present type of hinge.

One of the objects of my invention is to create a permanent frictional engagement between the spectacle frame and the temple bar. Another object accomplished by my invention is the frictional engagement created by the wedge shape contacting the side of the spectacle frame and temple bar hinge as is more specifically explained and set forth in this specification and disclosed in the accompanying drawings.

In my type of hinge, the tendency of the temple bar to fall back and forth against the frame has been substantially reduced due to the fact that the spring action of the barrels in the hinge is not dependent upon the tightening of the mounting or axle screw. In my invention, the screw merely acts as an axle. For example, a rivet could serve the same purpose.

One form of my invention is illustrated in the accompanying drawings. Figure 1 is a fragmentary enlarged top plan view of a section of a spectacle frame and temple bar partially broken away. Figure 2 is a section on the line 2—2 of Figure 1. Figure 3 is a section on the line 3—3 of Figure 1. Figure 4 is a similar view of like Figure 3, in a disassembled condition.

Reading on Figures 1 to 4 inclusive, 10 is a section of a frame, 11 is an extension of same, 12 is a temple bar; the same temple bar being mounted to the frame member 10 by hinge 14, consisting of a female section 15, and a male section 16. Said members 15 and 16 respectively are mounted to the frame member 10, and temple bar member 12, by attachments 17. The female portion 15 has two outer barrel portions 18 and 19. Barrel portion 19 has near its inner end a slot 20, thereby forming a flexible tongue section 21. Barrel portion 19 has a threaded hole 22. The male section 16 has an extending lug 23, with bore 24. One face of lug 23 is cut square to match the inner face of barrel portion 18, while the other face of lug 23 is cut to a positive angle other than a square and a tapering larger in the rear portion of said lug 23. Said lug 23 is shown in an exaggerated form in the figures of my said drawings.

In assembling the two hinge portions, the wedged face 29 of lug 23 is forced into space 27 formed by barrels 18 and 19; and as a result, will therefore tend to deflect the front or outer edge of tongue section 21 to conform to the wedge shape 29 of lug 23.

It can be readily seen that through this action a constant frictional pressure is created between the female and the male members of the hinge.

It is hereby stated that screw 28 acts only as an axle. The tension feature of my invention, namely my hinge arrangement, is cooperative with the screw or other holding means.

I do not intend to limit my novel type of hinge arrangement to use in a spectacle frame only, as it is apparent that it has many other and varied uses.

While I have illustrated my invention in one way only and using only one type of material and means, still I do not intend to limit myself to those particular means, designs, methods, materials, or uses, as it is apparent that other means, designs, methods, materials, or uses may be employed for obtaining the same or other results within the scope of claims asserted herein, without departing from the scope or spirit of my invention.

I claim:

1. In a hinge for spectacle mountings comprising a male member and a female member, said male member having an extending lug, one face of said male extending lug being at right angles, the other face of said male lug being cut to a positive angle other than a right angle, said female member consisting of two outer lugs, one of said outer lugs having near its inner end a slot, said slot being parallel with inner surface of said lug, said slot forming a flexible tongue, said slot being on the end of the female member of said hinge, which receives that part of the male member which is cut to a positive angle, other than a right angle, for the purpose of improving the frictional grip of said male and female members of said hinge.

2. In a spectacle hinge assembly, a frame member and temple member made of plastic, said temple member being mounted to said frame member by a hinge, means for holding said frame and temple bar and hinge together, said hinge consisting of a male member and female member, said male member having an extending lug, one face of said extending lug being cut at right angles, the other face of said extending lug being cut at an angle, other than a right angle, said female member having two outer lugs to receive the extending lug of the male member, the upper lug of said female member being cut at right angles, the lower lug of said female member being also cut at right angles, said lower lug also containing a slot cut at right angles, and cut parallel to the inner portion of said lower lug and forming a tongue like section, the purpose of said tongue like section being to increase the frictional grip between the male member and female member when said members are fastened together, substantially as described.

THOMAS J. FOX.

REFERENCES CITED

The following references are of record in the file of this patent:

UNITED STATES PATENTS

| Number | Name | Date |
|---|---|---|
| 1,588,807 | Powell et al. | June 15, 1926 |